US008851107B2

(12) United States Patent
Risse

(10) Patent No.: US 8,851,107 B2
(45) Date of Patent: Oct. 7, 2014

(54) SHUTOFF VALVE INTEGRATED INTO A PRESSURE REGULATOR

(75) Inventor: Claude Risse, Bertrange (FR)

(73) Assignee: Luxembourg Patent Company S.A., Lintgen (LU)

( * ) Notice: Subject to any disclaimer, the term of this patent is extended or adjusted under 35 U.S.C. 154(b) by 1220 days.

(21) Appl. No.: 12/667,182

(22) PCT Filed: Jul. 1, 2008

(86) PCT No.: PCT/EP2008/058424
§ 371 (c)(1),
(2), (4) Date: Dec. 1, 2011

(87) PCT Pub. No.: WO2009/003994
PCT Pub. Date: Jan. 8, 2009

(65) Prior Publication Data
US 2012/0085445 A1    Apr. 12, 2012

(30) Foreign Application Priority Data

Jul. 2, 2007   (EP) .................................. 07111498

(51) Int. Cl.
*F16K 31/12*    (2006.01)
*F16K 31/145*   (2006.01)
*F16K 1/44*     (2006.01)

(52) U.S. Cl.
CPC ............. *F16K 31/145* (2013.01); *F16K 1/443* (2013.01)
USPC ................. 137/505.12; 137/506; 137/505.42; 137/630.19

(58) Field of Classification Search
USPC .................... 137/506, 509, 510, 628, 630.17, 137/630.19, 630.22, 505.12, 505.21, 137/505.26, 505.29, 505.3, 505.34, 505.36, 137/505.39, 505.37, 505.42, 505.45
See application file for complete search history.

(56) References Cited

U.S. PATENT DOCUMENTS

| 1,035,576 | A | * | 8/1912 | Goodwin et al. ................. 236/8 |
| 1,264,006 | A | * | 4/1918 | Bucknam ................. 137/505.12 |
| 1,660,842 | A | * | 2/1928 | Hoesel ..................... 137/505.12 |
| 2,082,227 | A | * | 6/1937 | Stettner ......................... 137/328 |
| 3,481,357 | A | * | 12/1969 | Scheflow ................... 137/116.5 |

(Continued)

FOREIGN PATENT DOCUMENTS

DE   19539329 A1   4/1997
EP    1031900 A1   8/2000

(Continued)

*Primary Examiner* — Stephen M Hepperle
*Assistant Examiner* — Jessica Cahill
(74) *Attorney, Agent, or Firm* — James E. Walton; Richard G. Eldredge

(57) ABSTRACT

A gas releasing and/or regulating mechanism is equipped with a body (1) with a passage, a gas intake (2) and outlet (3), the intake and outlet being connected to the passage; elements to block (5, 6, 7, 8) the passage; mobile elements (9) which associated to the body (1) of the mechanism, define a low pressure chamber (11) below the blocking elements (5, 6, 7, 8), the mobile elements (9) operating the blocking elements (5, 6, 7, 8) depending on the pressure within the low pressure chamber (11). The blocking elements (5, 6, 7, 8) are made of a first shutter (5, 6) and a second shutter (7, 8) below the first in the passage; and the first and second shutters (5, 6, 7, 8) are mechanically connected so that the first shutter (5, 6) closes before the second one (7, 8).

13 Claims, 2 Drawing Sheets

(56) References Cited

U.S. PATENT DOCUMENTS

| | | |
|---|---|---|
| 4,031,917 A | 6/1977 | De John et al. |
| 4,275,764 A * | 6/1981 | Baret ................... 137/614.19 |
| 4,431,117 A * | 2/1984 | Genbauffe et al. ............ 222/3 |
| 4,513,881 A | 4/1985 | Heimovics, Jr. |
| 5,036,661 A | 8/1991 | Gris |
| 5,941,280 A * | 8/1999 | Hart et al. ................ 137/605 |
| 6,041,762 A | 3/2000 | Sirosh et al. |
| 6,901,952 B2 * | 6/2005 | Girouard ............. 137/505.12 |

FOREIGN PATENT DOCUMENTS

| | | |
|---|---|---|
| GB | 1116646 A | 6/1968 |
| GB | 2267950 A | 12/1993 |
| WO | 2006133736 A2 | 12/2006 |

* cited by examiner

SHUTOFF VALVE INTEGRATED INTO A PRESSURE REGULATOR

TECHNICAL CHARACTERISTIC

The invention is equipped with a releasing mechanism for gas under pressure such as for example hydrogen.

TECHNICAL STATUS

A releasing or regulating mechanism for gas under pressure is known from the document EP1031900 A (SMC CORPORATION) Aug. 30, 2000. It is equipped with a releasing mechanism made of a gas closing element with air tightness capabilities cooperating with a seat. This element is operated by a piston under the pressure of a first adjustable coil on one side and on the opposite side, under the pressure of the gas passing between the closing element and the seat. This pressure is applied by an airtight membrane surrounding the low pressure chamber below the closing element.

The pressure applied by the coil may be adjusted by turning the pre-compression knob of the first coil. Theoretically, it allows for the adjustment of the mechanism's operating pressure. Closing the mechanism is done by turning the knob to the maximum in the direction of the decompression of the coil. A second coil working in the opposite direction pushes the piston towards the top. Decompressing the first coil allows the second coil to lift the piston and, thus, closing the mechanism.

In case of air tightness deterioration between the closing element and its seat, the complete closure of the mechanism is no longer insured.

The document GB 2 267 950 A (JULIAN STEWARD TAYLOR) Dec. 22, 1993 also presents a mechanism of gas release similar in its principle to the one presented in the previous document and equipped with a safety system in case of air tightness deficiency from the releaser's seat. In fact, an additional closing element is placed above the releaser, which is under high pressure, and is maintained opened by a compression rod designed to burn in case of excessive pressure at the mechanism's outlet. In fact, the additional closing element is connected to a membrane placed under the releaser's outlet pressure which applies a compressing force on the rod. In case of clogging or icing of the releaser, the mechanism's outlet pressure may increase beyond the acceptable limit which would result in the rod burning and in the additional closing element closing under the force of the coil in the direction of closure.

The solution to the possible malfunctioning problem of the releaser's closing element as it is proposed in GB 2 267 950 A (JULIAN STEWARD TAYLOR) Dec. 22, 1993 is not satisfactory for reasons of cluttering and completely. Additionally, this safety system only works when the mechanism's outlet pressure reaches a certain threshold. This means that the system does not work when the apparatus is not connected to the mechanism. Thus, it does not operate as a safety valve but as a protection system aiming to limit the pressure on the user's side of the releaser.

AIMS OF THE INVENTION

The invention aims to bring a simple and compact solution to the previously mentioned problems, and presents a releasing mechanism equipped with a safe closing system.

According to the invention, a gas releasing and/or regulating mechanism is proposed, equipped with: a body with a passage, a gas intake and outlet, the intake and outlet being connected to the passage; elements to block the passage; mobile elements which associated to the body of the mechanism, define a low pressure chamber below the blocking elements, the mobile elements operating the blocking elements depending on the pressure within the low pressure chamber; the blocking elements are made of a first shutter and a second shutter below the first in the passage; and the first and second shutters are mechanically connected so that the first shutter closes before the second one.

The first and second shutters may each be equipped with a mobile blocking element cooperating with a respective seat attached to the body of the mechanism.

Preferably, the first shutter is designed so that a coil pushes it toward its seat in the normal direction of gas flow in order to close the passage, and is mechanically connected to the second shutter by a simple mechanical end stop so that the second shutter pushes the first one when opening occurs and so that there is a small give in the mechanical connection between the two shutters when both shutters are closed.

Preferably, the second shutter closes the gas flow when its mobile closing element is resting on its seat in the normal direction of gas flow.

The second shutter may be coupled to the mobile elements.

Preferably, the mobile element of the second shutter is pushed towards its seat by a coil resting on the mechanism's body and, preferably, is connected to the mobile elements by a mechanical end stop.

The mobile element of the first shutter may be equipped with a conical part cooperating with the seat of the first shutter, and with an elongated part stretching across the seat below the conical element.

The mobile element of the second shutter may be equipped with a conical part cooperating with the seat of the second shutter, and with an elongated part stretching across the seat below the conical element.

Release mechanism according to the previous claim, characterized by the fact that the mobile element's elongated part of the first shutter cooperates with the mobile element's conical part of the second shutter.

The mobile element's conical part of the second shutter may be equipped with a cavity receiving the mobile element's elongated part of the first shutter as end stop such as to transmit an opening movement from the second shutter from the mobile elements to the mobile element of the first shutter.

The mobile element's elongated part of the first shutter may be placed away from the cavity end stop of the second shutter receiving it when both shutters are closed.

BEST IMPLEMENTATION OF THE INVENTION

Figure 1:
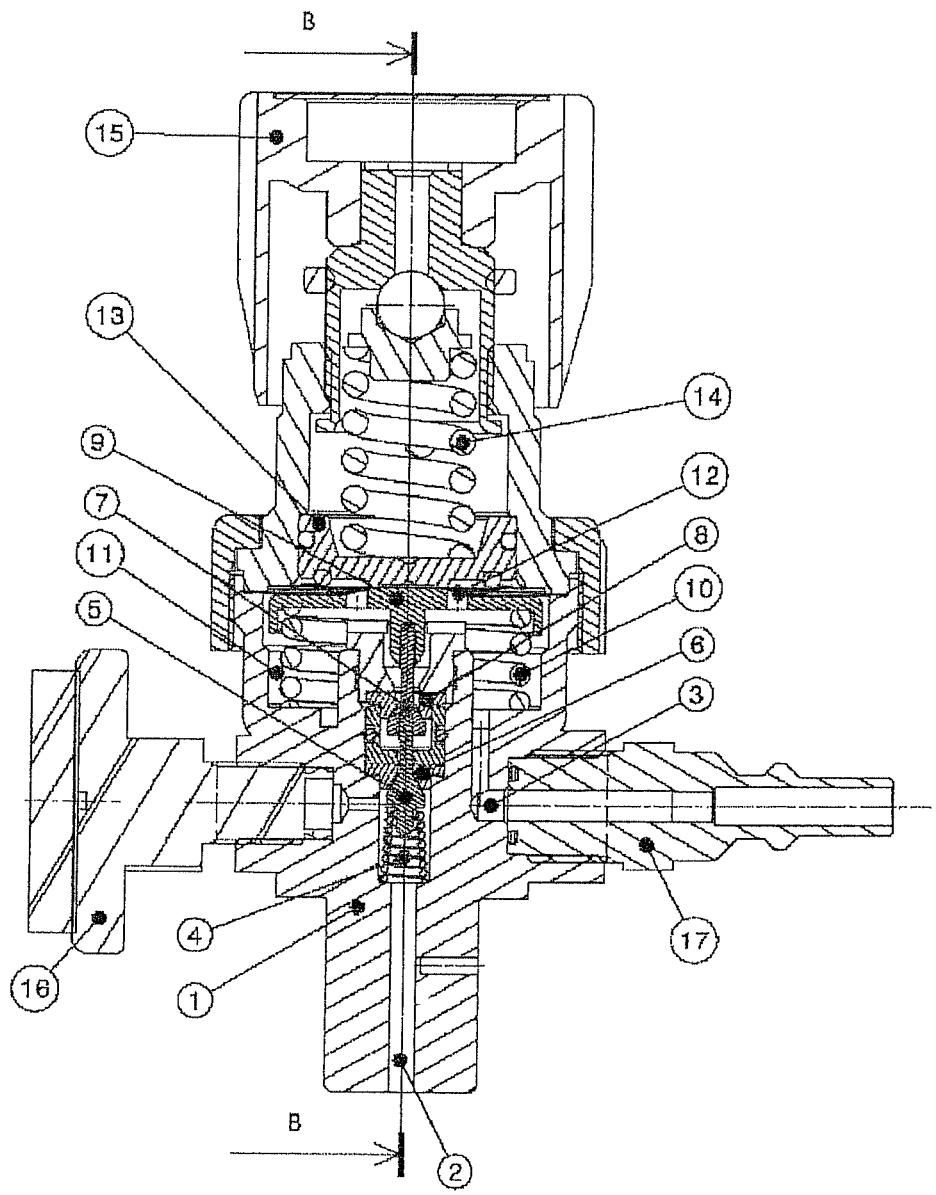
FIG. 1 shows a cross view of a gas releasing and/or regulating mechanism according to the invention.

The mechanism is made of a body 1 with a gas intake 2, an outlet 3 and a passage connecting the intake to the outlet. This passage is closed by two shutters placed in series and aligned according to the principal axis of the mechanism's body. The first shutter is equipped with a mobile element 5 of conical shape cooperating with seat 6 in an air tight manner. The seat may be removed or fixed directly to the body. A coil 4 applies pressure on the mobile element 5 in the closing direction of the first shutter. The mobile element 5 is equipped with an elongated part stretching from the conical part and across the orifice of seat 6. When closed the first shutter defines two zones: below it, a high pressure zone corresponding to the pressure in the bottle or the pipe to which the mechanism is connected to, and above the first shutter, a low pressure zone, where the gas has already partially been released. The second shutter is placed in series with the first one and below it. It is equipped with a mobile element 7 of conical shape cooperating with seat 8 in an air tight manner. As the first shutter, the seat may be removed or fixed directly to the body. When they are closed, both shutters as well as the passage in the mechanism's body define an intermediate chamber 20. In this intermediate chamber, the mobile element 7's conical part of the second shutter is equipped with a cavity receiving the extremity of the elongated part of the mobile element 5 in a sliding manner. The mobile element 7 is also equipped with an elongated part stretching from the conical part and across the orifice of seat 8. The extremity of this elongated part cooperates with a mobile element 9. This one defines with the mechanism's body and the second shutter, a chamber of low pressure in connection with the mechanism's outlet 3. Element 9. This one defines with the mechanism's body and the second shutter, a chamber of low pressure in connection with the mechanism's outlet 3.

A membrane 12 fixed to the mobile element 9 divides the upper part of the low pressure chamber in an air tight manner. The mobile element 9 is under pressure from a flexible element such as a coil 10 resting on the mechanism's body. In the case of the example of FIGS. 1 and 2, the coil 10 applies a vertical force towards the top. Thus, it tends to lift the element 9. This element is connected by the membrane 12 to the piston 13 and is able to slide in the top part of the mechanism's body, the piston 13 is itself under a vertical force from a flexible element such as a coil 14. This coil is resting on a ball bearing end stop which position dependent on the principal axis of the mechanism (and of the coil) may be adjusted by a knob 15. This knob allows for the adjustment of the mechanism's releasing pressure as well as for the closure of the mechanism.

Figure 2:
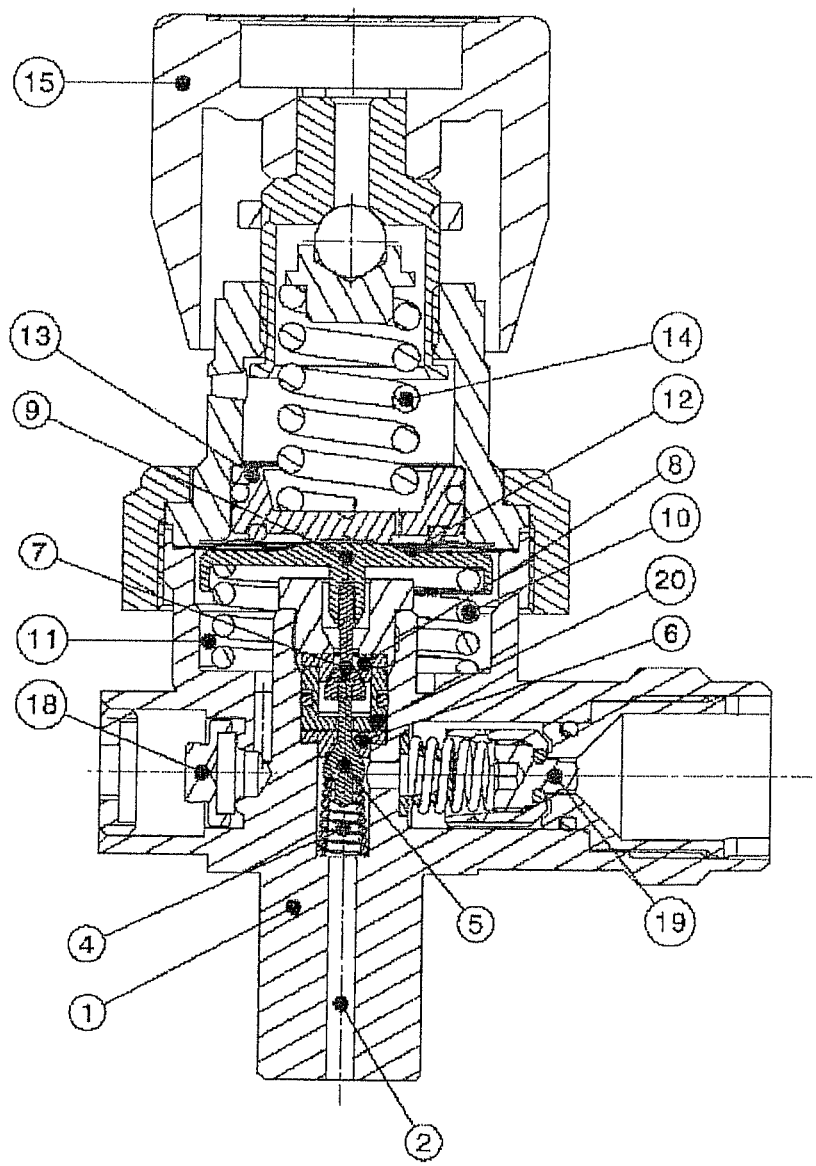
FIG. 2 shows the cross view of the line B-B of the mechanism in FIG. 1.

A manometer 16 is to be placed in direct connection with the high pressure. A connection 17 is designed on the side of the mechanism for the user. FIG. 2 also shows a excessive pressure valve 18 in direct connection with the low pressure chamber and thus with the mechanism's outlet. A filling mechanism 19 for the bottle is designed in the side of the mechanism in direct connection with the high pressure.

While operating, the knob 15 moves to apply enough pressure on coil 14 to balance the counter force of coils 4 and 10 and the counter force resulting from the pressure of the gas under high pressure working on a section of the mobile element 5 of the first shutter corresponding to the passage section. The mobile element 9 moves then slightly towards the bottom. This movement is transmitted directly to the mobile element 7 of the second shutter as well as to the mobile element 5 of the first shutter by the mechanical end stop. Once both shutters opened, pressure builds up in the intermediary chamber 20 as well as in the low pressure chamber 11. As the pressure builds up in the low pressure chamber, the membrane 12 is engaged on top and slightly moves the piston 13 towards the top by compressing the Coil 14. The mobile element 9 may then move towards the top in order to move the two mobile elements 7 and 5 of the shutters and to regulate the gas flow and thus regulate the work pressure in the low pressure chamber.

Engaging both mobile elements 5 and 7 results in the closure of the first shutter 5, 6 a little before the second shutter 7, 8 as the mobile element moves towards the top in order to close the mechanism. This indicates that the mobile element 7 does not yet touch its seat 8 as the mobile element 5 comes to rest in its seat 6. When the second shutter is closed, there is a little give between the extremity of the mobile element 5's elongated rod of the first shutter and the cavity bottom of the end stop of the mobile element 7 receiving it.

As the mechanism is closed, the knob is adjusted by the operator in order to release the maximum force from coil 14, and to elevate its end stop all the way to the coil 14's high limit. Thus the pressure from coils 4 and 10 is sufficient to balance the coil 14 in order to elevate the mobile element 9 and the piston 13. Since the mobile element 7 of the second shutter is linked to the mobile element, elevating the latter results in elevating element 7 as well. In turn, elevating the mobile element 7 allows the mobile element 5 to rise until close under the effect of coil 4. Once the first shutter closed, the pressure below it, and thus the pressure in the intermediate chamber 20 drops as the second shutter is not yet completely closed. As the operator continues to release the pre-constraint of coil 14 until it reaches the mechanical end stop for example, the mobile element 9 is able to rise further up and thus close the second shutter. From that point, the mechanism is doubly closed by the first and second shutters. The second shutter theoretically always works under low pressures, on the contrary; the first shutter is constantly under the high pressure of the bottle. The second shutter may then fully work as a safety shutter as long as it is theoretically only engaged when the first shutter leaks.

Please note that the second shutter should not necessarily be linked to the mobile element 9 of the releaser. In fact, the mobile element 7 may be under the force of the coil resting on the mechanism's body in a similar fashion as the mobile element of the first shutter. A simple apparatus like a "end stop" would suffice in this case between the mobile element 9 and the extremity of the elongated part of the mobile element 7.

The mobile elements 5 and 7 should not necessarily be conical shaped cooperating with their respective seats. In fact, it is possible to consider that one or both mobile elements would be equipped for example with a flat and circular element cooperating with a planned seat. Inversely, it is also possible that the seat, and not the shutter element, should be mobile.

The mobile element 9 cooperating with the membrane may be replaced by a completely different yet equivalent release command mechanism. In fact, one could replace it for example with a similar mobile element connected to a metallic blower in an air tight manner in order to form a low pressure chamber. This would eliminate the use of the membrane 12 since the metallic blower would insure the chamber air tightness.

The invention claimed is:
1. A gas regulating mechanism, comprising:
a body having a passage, an intake, and an outlet, the intake and outlet being connected to the passage;
a first shutter disposed in the passage, the first shutter having a first shutter element and a first seat;
a second shutter disposed in the passage downstream of the first shutter, the second shutter having a second shutter element and a second seat; and
a mobile element defining with the body a low pressure chamber downstream of the first shutter and the second shutter, and linked to the second shutter element;
a first spring in the low pressure chamber and acting on the mobile element for pushing the second shutter element toward the second seat in the direction of gas flow from the intake to the outlet, so as to close the passage, the low pressure chamber being configured such that the first spring surrounds the second shutter element and the second seat;

wherein the mobile element controls the first shutter and the second shutter dependent upon the pressure within the low pressure chamber, the first shutter and the second shutter being mechanically connected so that the first shutter closes before the second shutter.

2. The gas regulating mechanism according to claim 1, wherein the first seat is fixed to the body and the second seat is fixed to the body.

3. The gas regulating mechanism according to claim 1, further comprising:
   a second spring pushing the first shutter element toward the first seat in the normal direction of gas flow, so as to close the passage.

4. The gas regulating mechanism according to claim 1, wherein a bottom of the low pressure chamber forms a circular recess housing the first spring.

5. The gas regulating mechanism according to claim 1, wherein the first shutter element is designed so that a second spring pushes it towards its seat in the normal direction of gas flow in order to close the passage, and is mechanically linked to the second shutter element by a mechanical end stop so that the second shutter element pushes the first shutter element when opening occurs and there is a tittle play in the mechanical link between the two shutters when both shutters are closed.

6. The gas regulating mechanism according to claim 5, wherein there is a play in the mechanical connection between the first shutter element and the second shutter element when both first and second shutters are closed.

7. The gas regulating mechanism according to claim 1, wherein the low-pressure chamber comprises a raised central portion extending from a bottom of said chamber, said raised central portion housing the second shutter element and the second seat.

8. The gas regulating mechanism according to claim 7, wherein the raised central portion comprises a cap retaining the second seat in the central portion, the second shutter element being linked to the mobile element through a passage in the cap.

9. The gas regulating mechanism according to claim 1, wherein the first shutter element and the first seat are conical in shape so as to mate with each other to form an air tight seal, the first shutter element having a first elongated portion that extends through the first seat.

10. The gas regulating mechanism according to claim 9, wherein the first elongated portion cooperates with the second shutter element.

11. The gas regulating mechanism according to claim 10, wherein the second shutter element and the second seat are conical in shape so as to mate with each other to form an air tight seal, the second shutter element having a second elongated portion that extends through the second seat.

12. The gas regulating mechanism according to claim 11, wherein the second shutter element includes a cavity for receiving the first elongated portion, thereby transmitting the opening movement of the second shutter from the membrane to the first shutter element.

13. The gas regulating mechanism according to claim 12, wherein the first elongated portion is only partially disposed within the cavity when both the first shutter and the second shutter are closed.

\* \* \* \* \*